Figure 1:
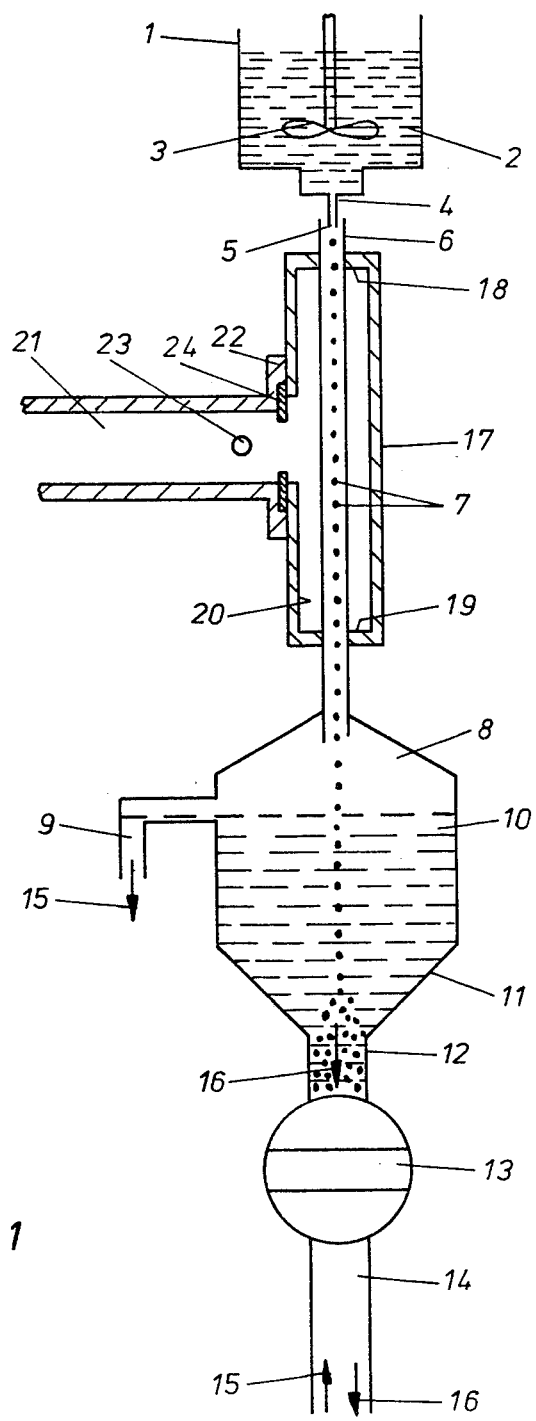
Figure 2:
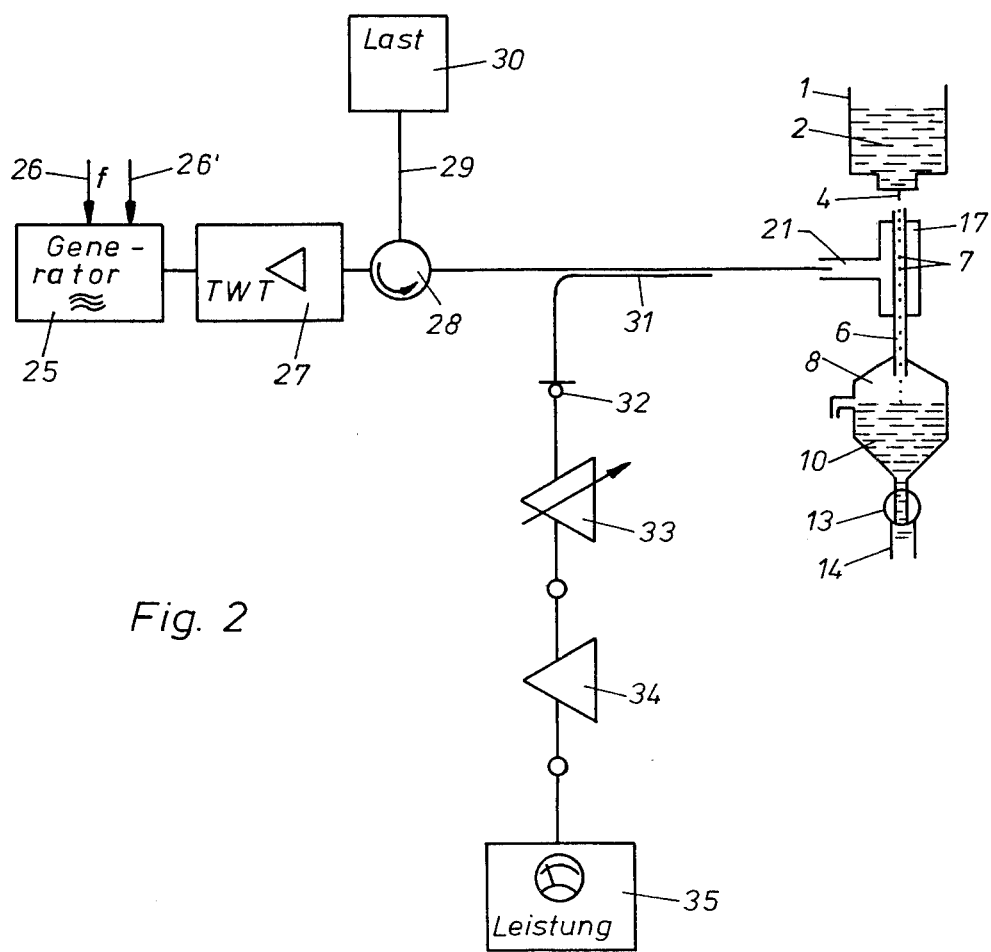

United States Patent

Jungo et al.

[11] 4,431,164
[45] Feb. 14, 1984

[54] PROCESS AND APPARATUS FOR PRODUCING MICROSPHERES

[75] Inventors: Charles Jungo, Untersiggenthal; Guido Ledergerber, Riniken, both of Switzerland

[73] Assignee: Gesellschaft zur Forderung der industrieorientierten Forschung an den Schweizerischen Hochschulen und weiteren Institutionen, Bern, Switzerland

[21] Appl. No.: 217,741

[22] Filed: Dec. 18, 1980

[30] Foreign Application Priority Data

Sep. 23, 1980 [DE] Fed. Rep. of Germany ....... 3035845

[51] Int. Cl.³ .......................... B22F 1/00; B29C 23/00; G21F 9/16; G21F 9/04
[52] U.S. Cl. .................................. 252/628; 252/632; 252/635; 75/0.5 A; 75/0.5 AB; 75/0.5 AA; 264/13
[58] Field of Search .............. 252/628, 632; 75/0.5 A, 75/0.5 AB, 0.5 AA; 264/13

[56] References Cited

U.S. PATENT DOCUMENTS 3,518,328  6/1970  Triggiani et al. ................... 252/635
4,060,497 11/1977  Huschka et al. ................... 252/635
4,184,976  1/1980  Zimmer ............................... 252/635
4,203,863  5/1980  Knotik et al. ...................... 252/632
4,224,258  9/1980  Langen et al. ..................... 252/635
4,242,220 12/1980  Sato .................................... 252/628

OTHER PUBLICATIONS

Hirschhorn, Introduction to Powder Metallurgy (1969) APMI, p. 30.

Primary Examiner—Brooks H. Hunt
Attorney, Agent, or Firm—Watson, Cole, Grindle & Watson

[57] ABSTRACT

Heat gelable droplets of a suitable liquid feed material are dielectrically heated to the gelling temperature by exposure to microwave radiation during free fall through a heating zone. The gelled microspheres thus produced are caught and collected in a washing liquid. The microwave radiation is provided through the use of a hollow cavity resonator. A vertical tube which is transparent to microwaves extends through the resonator to delimit the processing zone for the free falling droplets. Frequency control means and a reflected radiation measuring device are associated with the resonator and radiation generation means so that the operation of the system may be closely controlled.

27 Claims, 3 Drawing Figures

PROCESS AND APPARATUS FOR PRODUCING MICROSPHERES

BACKGROUND OF THE INVENTION

1. Field of the Invention

The instant invention relates to the production of microspheres, and more particularly to the production of gelled microspheres which comprise a compound that includes a non-metal element and a metal element. In its highly preferred aspects, the invention relates more specifically to the production of microspheres of a nuclear fuel material such as oxides, carbides, nitrides of uranium and/or plutonium.

2. Description of the Prior Art

Processes for the production of microspheres consisting of at least one compound that includes a metal element and a non-metal element such as oxygen, carbon or nitrogen, by internal gelling of droplets of a mixed feed solution which contains an ammonia doner such as hexamethylene tetramine in a concentrated metal salt solution are known.

Generally, one starts with a so-called mixed feed solution which is customarily prepared by admixture of an ammonia donor such as hexamethylene tetramine in a saturated metal nitrate solution. The mixture remains fluid as long as it is maintained at a low temperature, such as, for example, 5° C. But the mixture gels when it is heated.

It has been known previously to divide the cool mixed feed solution into droplets of as uniform a size as possible and to then introduce the droplets into a bath of hot hydrophobic liquid, such as, for example, silicon oil, so that the droplets will rigidify very quickly by gelling as a consequence of a great pH increase due to the formation of ammonia from the hexamethylene tetramine. Any hydrophobic liquid which adheres to the rigidified gelled microspheres may be removed with a chlorinated hydrocarbon. Subsequently, the gelled microspheres are washed in an ammoniac solution, preferably in a countercurrent process, in order to leach out soluble compounds, such as ammonium nitrate, hexamethylene tetramine and urea.

Such internal gelling processes have frequently, although not exclusively, been used for the production of ceramic nuclear fuels in the form of microspheres. For example, for production of microspheres of a uranium-plutonium nuclear fuel, the mixed feed solution may consist of a saturated aqueous solution of uranyl nitrate and plutonium nitrate which includes additives to facilitate the solidification reaction such as hexamethylene tetramine and urea. The solidified gelled-microspheres are then sintered after washing and possibly after preconditioning by heat treatment in a gaseous atmosphere of pre-determined composition at an elevated temperature. However, such wet chemical production process for nuclear fuel has considerable advantages, as compared to production from powders, since no dust contaminated with radioactive material is obtained. But the wet chemical production of nuclear fuel microspheres must be accomplished in an environment which provides radiation protection, and thus, it turns out that safety and precautionary measures for processes which involve the gelling of the drops in hot hydrophobic liquid are expensive and difficult to achieve.

SUMMARY OF THE INVENTION

It is an important purpose of the invention to provide a process and an apparatus for the production of microspheres of the mentioned type in a manner such that the heat needed for the solidification of the mixed feed droplets is applied without the use of a liquid heat carrier. Thus, the gelling process may be better controlled in order to prevent, as much as it is possible to do so, any possible disadvantageous effects due to successive processings of the microspheres, such as, for example, by sintering. It is also a desired object of the invention to avoid the necessity for washing of the microspheres with a chlorinated hydrocarbon.

The foregoing purposes and objects are basically achieved through the provision of a process for producing microspheres which comprises first providing a feed solution which contains a material to be formed into microspheres, the solution being capable of gelling when heated, then forming the solution into individual droplets and causing the droplets to fall freely under the influence of gravity along a vertical path through a heating zone, thereafter subjecting the falling droplets in the zone to sufficient microwave radiation to cause the droplets to be heated by dielectric heating to a temperature where gelling occurs whereby the droplets are solidified to present microspheres, and finally catching and collecting the microspheres thus formed. The microspheres may then be washed countercurrently and dried.

Preferably the material in the solution comprises a compound that includes a non-metal element and a metal element such as uranyl nitrate or plutonium nitrate. Specifically, the feed solution may contain an ammonia donor and urea so that upon heating the gelling occurs internally by chemical condensation in the presence of ammonia. The donor may preferably be hexamethylene tetramine.

The radiation for the foregoing process may preferably be in the form of a stationary irradiation field of X-band range microwaves disposed in the heating zone and preferably the maximum electric component of the field is disposed on noted path. And generally the field should be imposed in the $TE_{10(X)}$ mode wherein X has a value between 11 and 21 inclusive.

In a very important aspect of the invention, the process includes the step of confining the droplets falling through the noted zone within a vertical tube which is transparent to microwaves. Thus, radioactive substances may effectively be maintained in isolation.

The purposes and objects of the invention are also achieved by the provision of an appartus for producing microspheres which comprises a supply chamber for a feed solution containing a material to be formed into microspheres, the solution being capable of gelling when heated, and droplet-generating means at the bottom of the chamber for forming the solution into discrete droplets and releasing the latter one by one for gravitational free fall. A microsphere collection means is disposed vertically directly beneath the droplet-generating means in spaced relationship thereto for catching falling microspheres, there being a free fall zone extending vertically between the droplet-generating means and the microsphere collection means. Microwave radiation generation means are associated with the apparatus for imposing radiation in the zone to thereby cause the free falling droplets to be heated by electric heating to a temperature where gelling occurs.

The radiation generation means preferably is in the form of a hollow cavity resonator disposed around the zone between the droplet generating means and the microsphere collection means, and the apparatus of the invention preferably includes a hollow tube which is transparent to microwaves extending from the droplet-generating means, through the resonator and to the microsphere collection means, all in surrounding relationship to the noted zone.

In its more specific aspects, the apparatus of the invention is provided with a hollow wave guide connected to the resonator, and the radiation generation means further comprises a microwave generator equipped with control means for adjusting the operating frequency and starting performance. A traveling wave tube is provided for amplifying the generated microwaves, and a circulator mechanism is connected to the traveling wave tube and to the resonator by the wave guide. The circulator is provided with a lateral shunt arm closed with a load and is arranged such that radiation energy reflected from the resonator through the wave guide is deflected through the arm for absorption by the load.

The apparatus is also provided with a radiation energy-measuring device and a wave guide coupler disposed for receiving radiation energy reflected from the resonator and guiding such reflected energy into the device for measurement. Thus, the microwave frequency may be adjusted by the control means until the reflected radiation energy measured by the device is minimized. Preferably the resonator is dimensioned to produce an irradiation field in the $TE_{10(X)}$ mode, wherein X has a value between 11 and 21 inclusive.

BRIEF DESCRIPTION OF THE DRAWINGS

FIG. 1 is a schematic presentation of the various components of an apparatus for the production of microspheres in accordance with the invention; and FIG. 2 illustrates a circuit diagram for a microwave system useful in accordance with the invention.

DETAILED DESCRIPTION OF THE INVENTION

As can be seen from FIG. 1, a preferred embodiment of an apparatus for the production of microspheres according to the invention includes a supply vessel 1 for a mixed feed solution 2. Refrigeration means (not shown) may be provided such that vessel 1 is maintained at an essentially constant temperature of about 5° C. Vessel 1 is provided with a motor driven agitator 3 and is equipped with a droplet generator 4 of known construction at its base. A for microwave transparent plastic pipe or tube 6 of polytetrafluoroethylene or the like, is disposed in upstanding vertical disposition in axially alignment with outlet opening 5 of droplet generator 4, so that mixed feed drops 7 delivered by the drop generator 4 may fall freely through pipe 6 under the influence of gravity without contacting the walls thereof. Pipe 6 leads into a collecting vessel 8 which has a lateral overflow 9. The conical bottom 11 of vessel 8 passes over into a socket 12 that is closed by a ball valve 13. A washing column 14 of the customary construction, preferably a vibration bed column, follows the ball valve 13. Such column is described, for example, in Swiss Pat. No. 629,968 therefore is not shown in more detail in FIG. 1.

Pipe 6 is disposed coaxially within a hollow cavity resonator 17 and extends through the upper and lower closing walls 18, 19 thereof. A hollow wave guide conductor 21 is attached to lateral wall 20 of resonator 17 by means of a flange 22. Conductor 21 contains at least one adapting screw 23 and is coupled with resonator 17, for example, by way of a shutter 24, as is known from microwave engineering. Resonator 17 and conductor 21 are part of a microwave system for which a block circuit diagram is illustrated in FIG. 2 and which is described in more detail hereinbelow.

In accordance with the invention, mixed feed drops 7 delivered by drop generator 4 fall freely under the influence of gravity and are heated to the gelling temperature in the heating zone in tube 6 by dielectric heating by microwave radiation in an form of a stationary irradiation field of X-band range microwaves. The mixed feed solution 2, located in the supply vessel 1, contains, besides the one or more metal salts, the reactive substances necessary for solidification through internal gelling, such as hexamethylene tetramine and urea, and droplet generator 4 produces drops of essentially uniform size from the mixed feed solution. In operation, microwave energy is stored as a stationary wave in resonator 17, and pipe 6 is disposed in resonator 17 in such a way that the droplets 7 falling through pipe 6 cross through an area of a maximal electric field component and absorb field energy through dielectric losses. This absorption of energy causes a temperature increase in droplets 7 which leads to the triggering of the gelling. The gelling of droplets 7 should progress so far in themicrowave field that the gelled microspheres no longer may be damaged in case of the subsequent treatment. That is to say, the distance of free fall in the microwave field must be sufficiently long to cause the droplets to be heated to the gelling temperature. And correspondingly, resonator 17 and pipe 6 must be suitably dimensioned to achieve such result. Pipe 6 in the inner cavity of resonator 17 delimits a relatively tight processing space for mixed feed droplets 7 while an atmospheric environment is present in the remaining cavity in resonator 17. This tight processing space presenting a flow channel generally creates more favorable conditions for uniform gelling of the mixed feed drops than would the entire internal cavity of resonator 17, which is voluminous in comparison to the former. Pipe 6 also provides a special advantage in case of the production of nuclear fuel microspheres, since in such case, the space inside pipe 6 may be contaminated by radioactive material, but the hollow space resonator 17 is not.

Capturing vessel 8 contains a washing liquid, for example, an aqueous ammonia solution 10, into which gelled microspheres 7 drop from the pipe 6. At this point, the microspheres will be gelled to such a point that upon submerging into the ammonia solution they are no longer subject to deformation. The microspheres may be fed to a washing column 14, continuously or cyclicly from capturing vessel 8, by being fed through a ball valve 13 and into the ammonia solution of column 14, as indicated in FIG. 1. Arrows 15 represent the direction of flow of the washing liquid and arrows 16 represent the direction of movement of the microspheres.

The preferred embodiment of the microwave system which includes resonator 17 is illustrated by a block circuit diagram presented in FIG. 2. As mentioned, the microwave arrangement preferably operates in the X-band, therefore with wavelengths around 3 cm. A microwave generator 25 of customary construction and having an output in the mW-range is provided with an adjusting mechanism 26 whereby the frequency of the produced microwaves is adjustable within the X-band. A travel wave tube 27 (TWT) is connected to generator 25 for increasing the delivery output up to about 100 Watt. The thusly reinforced microwave is fed into resonator 17 by way of a circulator 28 and a hollow wave guide 21 containing adapting screw(s) 23 (FIG. 1) and closable with mixed shutter 24. Circulator 28 will prevent waves reflected from resonator 17 from getting back into travel wave tube 27. Such reflected waves are deflected into a side shunt arm 29 of circulator 28 and are destroyed there by load 30.

Resonator 17 is preferably dimensioned in the shape of a block and for the mode $TE_{10(X)}$, wherein X has a value between 11 and 21 inclusive. Resonator 17 represents the load in a microwave system.

A directional coupler 31 is connected to guide 21 by way of which a small portion of any radiation reflected from resonator 17 is guided to a radiation energy-measuring device 35 via a hollow conductor-to-coaxial-transition 32 and two series-connected coaxial attenuators 33 and 34, one of which is variable.

In operation, the microwave frequency is tuned to the resonance frequency of the resonator 17 when plastic pipe 6 is loaded with mixed feed drops 7. Generator 25 is adjusted for each special case involving the composition, size and sequence of the mixed feed drops delivered by the drop generator 4, so that a microwave of corresponding frequency may be provided. For this purpose, the frequency of the microwave is varied by means of adjusting mechanism 26 on microwave generator 25 and at the same time measuring device 35 is observed. In case of optimum resonance, the measured reflected radiation is minimized. Microwave generator 25 is thus calibrated and then remains set for the corresponding frequency. Such setting takes only a little time and is accomplished effectively during trial runs which are customary.

Experimentally, satisfactory gelling was achieved using a $TE_{10(11)}$-hollow cavity resonator, as follows:

The inside measurements of the block shaped, silver coated, hollow cavity resonator 17 amounted to 22.86 mm×10.16 mm×156.79 mm. Hollow guide 21, an R 100 element, was flanged to the middle of the narrow lateral surface that is 10.16 mm×156.79 mm. Mixing shutter 24, acting as an LC-parallel resonance circuit, had a rectangular opening of 18.13 mm×6 mm. Several M 3 screws were provided in the middle of the broad side of guide 21 for the adaptation of the impedance between guide 21 and resonator 17.

Such a hollow cavity resonator, unloaded and without pipe 6, has a natural resonance frequency of 12.4 GHz in the mode $TE_{10(11)}$, and the wave length in the hollow cavity resonator amounts to 2.85 cm. A pipe 6 of polytetrafluoroethylene (teflon) with an inside diameter of 8 mm and an outside diameter 10 mm was inserted into the resonator. The resonance frequency dropped to 12.2 GHz and the quality factor amounted to 30,000 with such a pipe 6. Whenever the pipe 6 is loaded with drops from an aqueous mixed feed solution, an additional generally slight change in the resonance frequency still occurs and the resonance frequency amounts, for example, in the case of droplets of water, to about 12.19 GHz. The dropping distance in the microwave field decisive for the heating of the droplets amounts, in this case, consequently, to only about 15.6 cm. This relatively short distance, however, is sufficient to heat freely falling mixed feed droplets to a temperature guaranteeing gelling, in the case of the previously stated output of about 100 Watt.

We claim:

1. A process for producing microspheres comprising:

(a) providing a feed solution which contains a material to be formed into microspheres and an ammonia-donor compound, said feed solution being capable of gelling when heated;

(b) forming said solution into individual droplets;

(c) causing said individual droplets formed in step (a) to fall freely under the influence of gravity along a vertical path through a heating zone;

(d) subjecting said falling droplets in said heating zone to sufficient X-band range microwave radiation to cause the droplets to be heated by dielectric heating such that they will become sufficiently gelled that upon subsequent impact with and submersion in a washing liquid they will not be deformed or damaged; and (e) causing said gelled droplets produced in step (d) to fall into a washing liquid so as to be recoverable as microspheres, said washing liquid consisting of an aqueous ammonia solution.

2. A process as set forth in claim 1 wherein said material comprises a compound that includes a non-metal element and a metal element.

3. A process as set forth in claim 2 wherein said non-metal element is oxygen.

4. A process as set forth in claim 2 wherein said non-metal element is carbon.

5. A process as set forth in claim 2 wherein said non-metal element is nitrogen.

6. A process as set forth in claim 2 wherein said compound comprises uranyl nitrate.

7. A process as set forth in claim 2 wherein said compound comprises plutonium nitrate.

8. A process as set forth in claim 1 wherein said donor is hexamethylene tetramine.

9. A process as set forth in claim 1 wherein said radiation is in the form of a stationary irradiation field of X-band range microwaves disposed in said zone.

10. A process as set forth in claim 9 wherein the maximum electric component of the field is disposed on said path.

11. A process as set forth in claim 1 including the step of confining the droplets falling through said zone within a vertical tube which is transparent to microwaves.

12. A process as set forth in claim 9 wherein said field is imposed in the $TE_{10(X)}$ mode wherein X has a value between 11 and 21 inclusive.

13. A process as set forth in claim 1 wherein the collected microspheres are washed countercurrently and are subsequently dried.

14. Apparatus for producing microspheres comprising:

a supply chamber for a feed solution containing a material to be formed into microspheres, said solution being capable of gelling when heated;

droplet-generating means at the bottom of said chamber for forming said solution into discrete droplets and releasing the latter one by one for gravitational free fall;

microsphere collection means disposed sufficiently beneath said droplet generation means to provide a free fall zone therebetween, said microsphere collection means containing a washing liquid consisting of an aqueous ammonia solution;

pipe means connected to said microsphere collection means to allow washing liquid to be supplied thereto and gelled microspheres to be simultaneously removed therefrom;

microwave radiation generation means associated with said apparatus for imposing X-band range microwave radiation in said free fall zone to thereby cause the free falling droplets to be heated by dielectric heating to a temperature where gelling occurs, such that said free falling droplets will commence gelling prior to impact with and submersion in the washing liquid in said microsphere collection means.

15. Apparatus as set forth in claim 14 including a hollow tube which is transparent to microwaves extending from said droplet-generating means to said microsphere collection means in surrounding relationship to said free fall zone.

16. Apparatus as set forth in claim 15 wherein said radiation generation means comprises a hollow cavity resonator disposed around said free-fall zone between said droplet-generating means and said microsphere collection means, said tube extending through the resonator.

17. Apparatus as set forth in claim 14 wherein said radiation generation means comprises a hollow cavity resonator disposed around said free-fall zone between said droplet-generating means and said microsphere collection means.

18. Apparatus as set forth in claim 16 wherein said radiation generation means includes a control means for adjusting the microwave frequency.

19. Apparatus as set forth in claim 17 wherein said radiation generation means includes a control means for adjusting the microwave frequency.

20. Apparatus as set forth in claim 18 including a radiation energy-measuring device and a wave guide coupler disposed for receiving radiation energy reflected from said resonator and guiding such reflected energy into the device for measurement, whereby said microwave frequency may be adjusted by the control means until the reflected radiation energy measured by the device is minimized.

21. Apparatus as set forth in claim 19 a radiation energy-measuring device and a wave guide coupler disposed for receiving radiation energy reflected from said resonator and guiding such reflected energy into the device for measurement, whereby said microwave frequency may be adjusted by the control means until the reflected radiation energy measured by the device is minimized.

22. Apparatus as set forth in claim 16 a hollow wave guide connected to said resonator and wherein said radiation-generation means further comprises a microwave generator equipped with control means for adjusting the operating frequency and starting performance, a traveling wave tube for amplifying the generated microwaves, and a circulator mechanism connected to said traveling wave tube, said circulator mechanism being connected to the resonator by said wave guide and being provided with a lateral shunt arm closed with a load, said circulator mechanism being arranged such that radiation energy reflected from the resonator through said wave guide is deflected through said arm for adsorption by said load.

23. Apparatus as set forth in claim 17 including a hollow wave guide connected to said resonator and wherein said radiation generation means further comprises a microwave generator equipped with control means for adjusting the operating frequency and starting performance, a traveling wave tube for amplifying the generated microwaves, and a circulator mechanism connected to said traveling wave tube, said circulator mechanism being connected to the resonator by said wave guide and being provided with a lateral shunt arm closed with a load, said circulator mechanism being arranged such that radiation energy reflected from the resonator through said wave guide is deflected through said arm for adsorption by said load.

24. Apparatus as set forth in claim 22 including a radiation energy-measuring device and a wave guide coupler disposed for receiving radiation energy reflected from said resonator and guiding such reflected energy into the device for measurement whereby said microwave frequency may be adjusted by the control means until the reflected radiation energy measured by the device is minimized.

25. Apparatus as set forth in claim 23 including a radiation energy-measuring device and a wave guide coupler disposed for receiving radiation energy reflected from said resonator and guiding such reflected energy into the device for measurement whereby said microwave frequency may be adjusted by the control means until the reflected radiation energy measured by the device is minimized.

26. Apparatus as set forth in claim 16 wherein said resonator is dimensioned to produce an irradiation field in the $TE_{10(X)}$ mode, wherein X has a value between 11 and 21 inclusive.

27. Apparatus as set forth in claim 17 wherein said resonator is dimensioned to produce an irradiation field in the $TE_{10(X)}$ mode, wherein X has a value between 11 and 21 inclusive.

* * * * *